United States Patent [19]

Tomoser

[11] 4,169,277
[45] Sep. 25, 1979

[54] REEL-TO-REEL ADAPTER FOR TAPE CARTRIDGE PLAYER

[76] Inventor: Herbert Tomoser, 422 Washington Ave., Kenmore, N.Y. 14217

[21] Appl. No.: 963,016

[22] Filed: Nov. 22, 1978

[51] Int. Cl.² .................. G11B 15/28; G11B 15/29
[52] U.S. Cl. .................................................. 360/94
[58] Field of Search ...................................... 360/94

[56] References Cited

U.S. PATENT DOCUMENTS

| 3,895,765 | 7/1975 | Korn | 360/94 |
| 4,031,555 | 6/1977 | Hughes | 360/94 |

Primary Examiner—Robert S. Tupper
Attorney, Agent, or Firm—Bean, Kauffman & Bean

[57] ABSTRACT

An adapter is disclosed for use in playing reel-to-reel magnetic tapes on a conventional tape cartridge player. The adapter includes a mounting portion whose configuration is generally complimentary to the configuration of a conventional tape cartridge and adapted to be inserted into a tape cartridge receiving recess of the player in place of such tape cartridge; and a supporting portion adapted to support a pair of tape reel mounting spindles. The mounting portion is designed and the reels are driven in a manner permitting the reels to alternatively function as supply and take-up reels incident to inversions of the mounting portion when inserted within the recess of the player.

20 Claims, 5 Drawing Figures

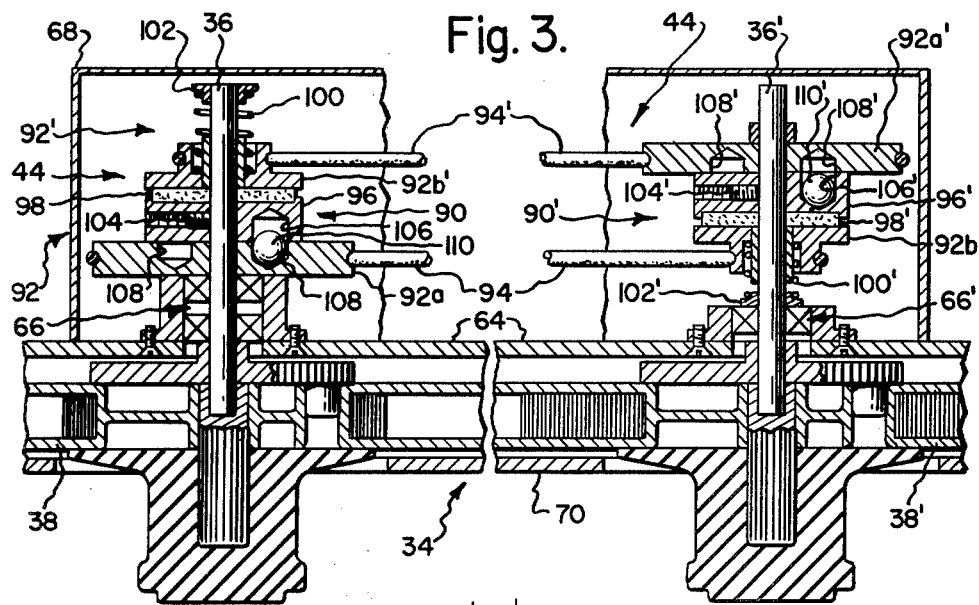
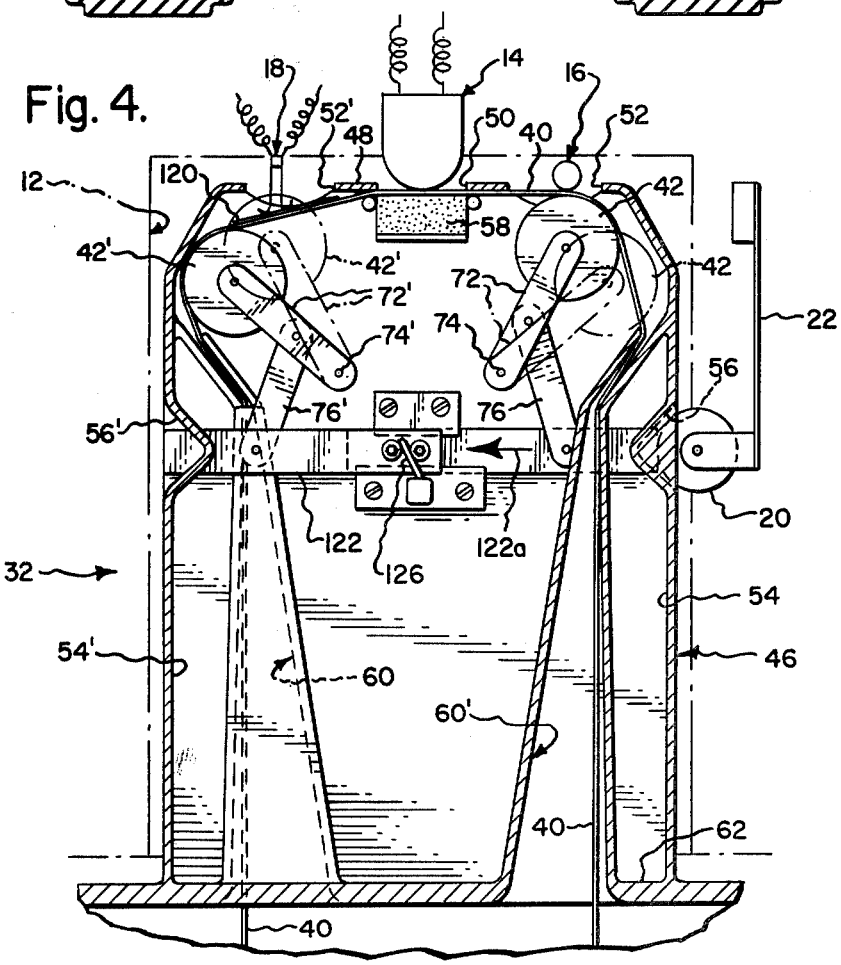

REEL-TO-REEL ADAPTER FOR TAPE CARTRIDGE PLAYER

BACKGROUND OF THE INVENTION

The present invention relates to improvements in magnetic tape player systems and more particularly to an improved adapted providing for reel-to-reel performance with a conventional tape cartridge player.

It has heretofore been proposed to provide adapters for accommodating reel-to-reel magnetic tapes for use with tape cartridge players, as evidenced for instance by U.S. Pat. Nos. 3,644,684; 3,895,765; 4,031,555 and 4,074,876. These prior adapters of which I am aware suffer from one or more of the disadvantages including complexity of construction, inability to properly play magnetic tape fed in opposite directions between reels without requiring reel reversal and/or inability to be used with a conventional tape cartridge player without requiring modifications of the construction of a standard player.

SUMMARY OF THE INVENTION

The present invention is directed towards an improved adapter, which may be employed with a conventional tape cartridge player to play magnetic tape passed back and forth between a pair of reels alternatively serving as take-up and supply reels without need for changing positions of such reels relative to the adapter.

In accordance with the present invention, the adapter includes a mounting portion shaped for receipt within a tape cartridge receiving recess of a conventional player alternatively in relatively inverted first and second positions, a support portion carried by the mounting portion and serving to support a pair of tape reel mounting spindles, and means cooperating with the capstan of the player, when the mounting portion is inserted within the recess in its alternative positions, for transporting tape in opposite directions between the reels in operative proximity with the magnetic reading head of the player. The latter means includes a pair of pinch rollers adapted to alternately cooperate with the capstan to withdraw tape from that one of the reels temporarily serving as a supply reel and separate drive means for effecting tape take-up producing rotation of the other of the reels temporarily serving as a take-up reel. In preferred embodiments of the invention, the separate drive means permits automatic change in the supply and take-up functions of the respective reels incident to the act of inverting the adapter and reinserting same into the recess of the player.

With the present adapter, all tracks present on a magnetic tape may be successively played by means of inserting the adapter into the tape cartridge player in successive inverted positions. Thus, the present adapter avoids the substantial loss of listening time heretofore encountered with prior real-to-reel adapters, which required separate tape rewinding operations or reversal of reel positions and accompanying re-threading of tape through the adapter.

DRAWINGS

The nature and mode of operation of the present invention is now more fully described in the following detailed description taken with the accompanying drawings wherein:

FIG. 3 is a sectional view taken generally along the line 3—3 in FIG. 2;

FIG. 4 is a view similar to FIG. 2, but showing an alternative form of the present invention.

DETAILED DESCRIPTION

Figure 1:
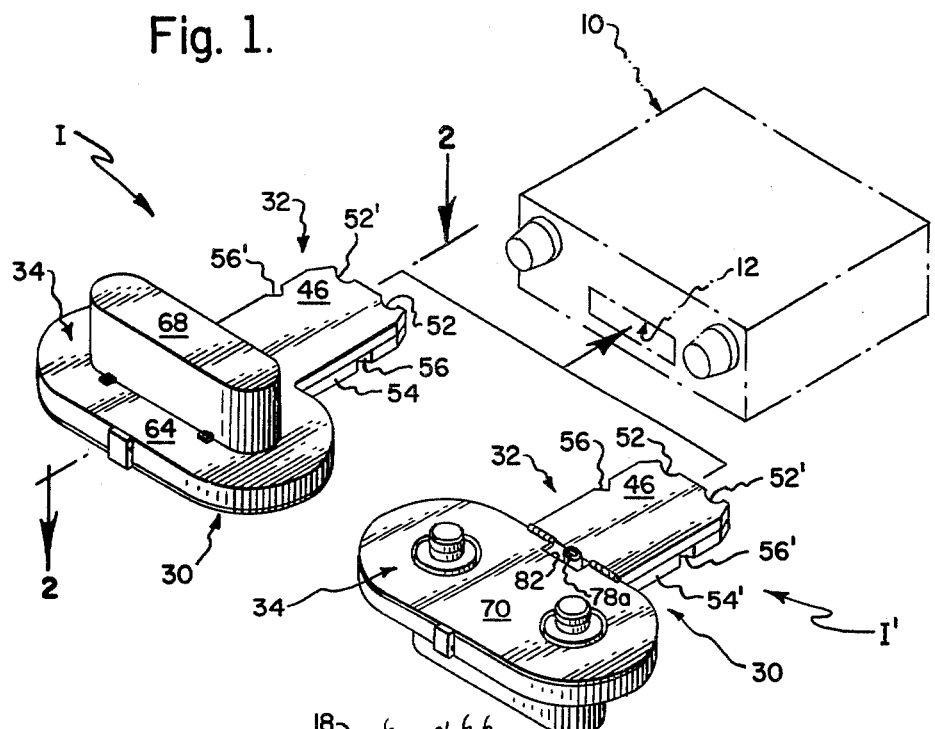
FIG. 1 is a perspective view showing an adapter of the present invention arranged in its relatively inverted first and second position and in association with a conventional tape cartridge player.
Figure 2:
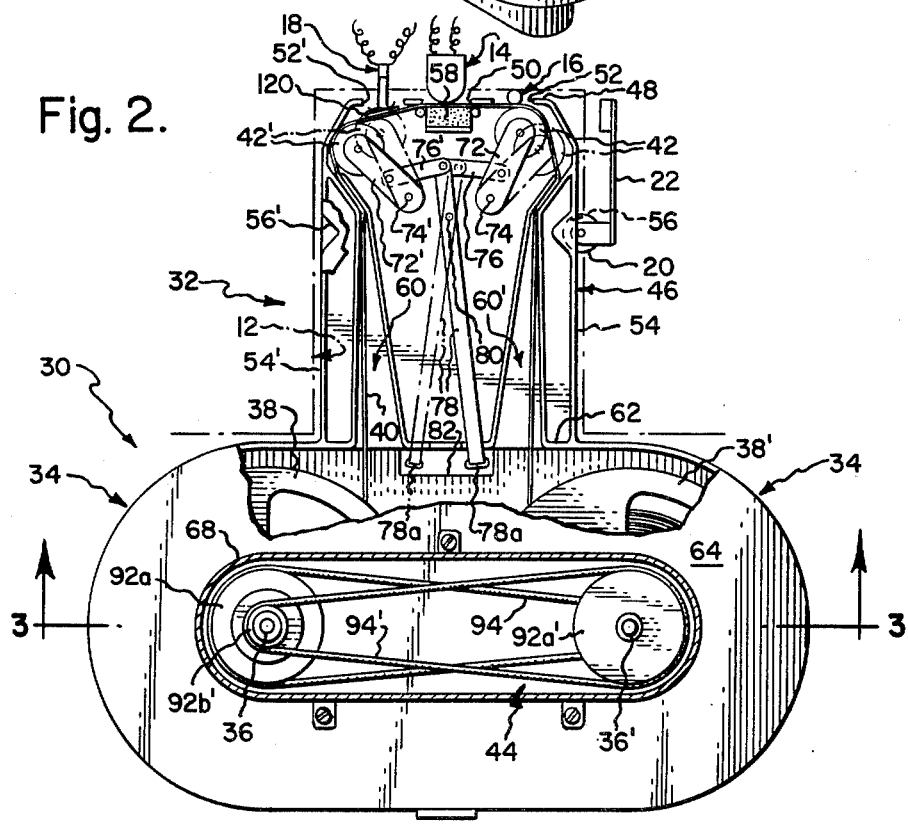
FIG. 2 is a sectional view taken generally along the line 2—2 in FIG. 1.

Reference is now made particularly to FIG. 1, wherein a conventional tape cartridge player is generally designated as 10 and shown as being formed with a recess or cavity 12, which is sized to receive a standard eight-track tape cartridge, not shown. In FIGS. 2 and 4, standard elements of player 10, which are arranged adjacent recess 12 and used in the practice of the present invention, are shown as including a magnetic head 14; a tape transport means, such as a capstan 16; a tape position detecting element 18; and a tape cartridge retaining device, such as may be defined by a roller 20 carried by a spring strip 22. The construction and mode of operation of these elements, as well as the speaker, amplifier and associated electrical circuits, not shown, provided in a conventional tape cartridge player are well known and thus need not be described in detail.

In accordance with the present invention, an adapter generally designated as 30 in the drawings is employed to permit playing of conventional reel-to-reel magnetic tapes by player 10 without requiring modification of the player in any respect. To facilitate the following description of adapter 30, it will be understood that the adapter is intended to assume first and second relatively inverted operative positions relative to player 10 and that such positions have been arbitrarily designated by numers I and I' in FIG. 1.

Adapter 30 generally comprises a mounting portion 32; a support portion 34 carried by the mounting portion; a pair of spindles 36 and 36', which are journalled on the support portion and serve to mount a pair of conventional tape reels 38 and 38'; and an arrangement cooperating with capstan 16 for transporting a conventional magnetic tape 40 in opposite directions between the reels. In a preferred form of the present invention, this last mentioned arrangement includes a pair of pinch rollers 42 and 42', which cooperate with capstan 16 to withdraw tape 40 from alternate ones of reels 38 and 38', respectively, and drive means 44 for effecting tape take-up producing rotations of the other of such reels.

Mounting portion 32 includes a casing or housing 46, which is of rectangular box-like construction and of a size and external configuration generally complimentary to that of a standard tape cartridge, not shown. By viewing FIG. 2, it will be seen that casing 46 is characterized as having a front wall 48 formed with a centrally located aperture 50 arranged for alignment with magnetic head 14 when the casing is inserted within recess 12 in either of the first or second positions of adapter 30. Further, front wall 48 is formed with a pair of apertures 52 and 52', which are disposed on opposite sides of central aperture 50. It will be understood that when adapter 30 is in its first position, apertures 52 and 52' are operably aligned with capstan 16 and detecting element 18, respectively, whereas when the adapter is in its second position, apertures 52 and 52' are disposed in operative alignment with detecting element 18 and capstan 16, respectively.

Casing 36 is also characterized as having its spaced side walls 54 and 54' formed with notches or recesses 56 and 56', which are arranged to alternately cooperate with roller 20 for releasably retaining the adapter in its tape playing or operative position within recess 12 when in its first and second positions. Further, casing 46 is shown as being fitted with a conventional tape backup plate 58 and a pair of internal tape threading or guide channels 60 and 60', which have their forwardly disposed ends arranged to open adjacent apertures 52 and 52' and their rearwardly disposed ends arranged to open through rear wall 62 of the casing. Preferably, casing 46 is of a molded plastic sectionalized construction, as indicated in FIG. 1, wherein the walls of guide channels 60 and 60' are formed integrally with the outer walls of the casing.

Support portion 34 generally includes a base portion 64, which is suitably fixed to or formed integrally with casing 46 and carries a pair of bearing devices 66 and 66' for journalling spindles 36 and 36'; an enclosure 68 for drive means 44, which is suitably fixed to the base portion; and a releasably latched cover plate portion 70, which is hingedly secured to the base portion to afford access to reels 38 and 38'.

Pinch rollers 42 and 42' are shown in FIG. 2 as being supported within casing 47 by pivot arms 72 and 72' journalled on casing mounted pivot pins 74 and 74'. Pivot arms 72 and 72' are interconnected for relative movements by a linkage system, which includes a pair of links 76 and 76', which have their opposite ends movably connected to arms 72 and 72' and their adjacent ends movably connected to a manual operator arm or lever 78. Arm 78 is journalled on a casing mounted pivot pin 80 and has an operating end portion 78a arranged to project successively through casing rear wall 62 and an aperture 82 formed in cover plate 70. In FIG. 2, the first and second play control positions of manual operator 78 are shown in full and broken line, respectively. Operator 78 may be releasably retained in a selected one of its controlled positions by any suitable means, such as by notches formed in casing rear wall 62.

In the first play control position of operator 78, pinch rollers 42 and 42' are forced to assume their operative and inoperative positions, shown in full line in FIG. 2, wherein the pinch rollers are disposed adjacent and remote relative to their associated casing front wall apertures 52 and 52'. When casing 46 is inserted within recess 12, while in its first position and pinch roller 42 is disposed in its operative position, pinch roller 42 is arranged to cooperate with capstan 16 for the purpose of withdrawing tape 40 from reel 38 in the manner shown in FIG. 2. On the other hand, when pinch roller 42' assumes its inoperative position, it is spaced sufficiently from aperture 52' to avoid interference with detecting element 18. In the second play control position of operator 78, pinch rollers 42 and 42' would be forced to assume their inoperative and operative positions shown in broken line in FIG. 2.

Now making particular reference to FIGS. 2 and 3, it will be understood that drive means 44 generally includes a pair of clutch devices 90 and 90', which are associated with spindles 36 and 36', respectively; two pairs of pulleys 92 and 92', wherein each pair includes relatively large and relatively small diameter pulleys, which are arranged in a coplanar relationship and designated by the suffixes "a" and "b", respectively; and a pair of drive belts 94 and 94', which are trained about pairs of pulleys 92 and 92', respectively.

Clutch devices 90 and 90' generally include clutch plates 96 and 96'; friction discs 98 and 98', which are disposed operatively intermediate the clutch plates and small diameter pulleys 92b and 92b'; and coil springs 100 and 100', which are disposed concentrically of spindles 36 and 36' in an end bearing relationship to spindle mounted stops 102 and 102' and small pulleys 92b and 92b'. Clutch plates 96 and 96' are suitably fixed for rotation with spindles 36 and 36', as by set screws 104, 104', and are formed with recesses 106 and 106', which are arranged for axial alignment selectively with annularly spaced recesses 108 and 108' formed in large pulleys 92a and 92a'. Recesses 106 and 106' are axially sized to wholly receive latch elements in the form of balls 110 and 110', whereas recesses 108 and 108' are formed with axial lengths slightly in excess of one-half of the diameter of balls 106 and 106'. As will be apparent from viewing FIG. 3, springs 100 and 100' tend to maintain a frictional drive connection between pulley 92b and clutch plate 96' via friction disc 98' and between pulley 92b' and clutch plate 96 via friction disc 98. It will also be apparent that the force of gravity acting on balls 110 and 110', when adapter 30 is disposed in its first position, serves to move such balls into their position shown in FIG. 3, whereby positively locking pulley 92a for rotation with clutch plate 96 and freeing pulley 92a' for rotation relative to clutch plate 96'. Thus, when adapter 30 is disposed in its first position and when rotation is imparted to spindle 36, as a result of tape being withdrawn from reel 38 by means of capstan 16 and pinch roller 42, pulley 92a is driven at a speed corresponding to the rotational speed of reel 38 and in turn serves to drive pulley 92b via belt 94. The previously described frictional drive connection between pulley 92b and clutch plate 96' serves to drive spindle 36' and thus reel 38' whereby the latter is caused to function as a take-up reel. While in the illustrated first position of adapter 30, a friction drive connection also exists between pulley 92b' and clutch plate 96, the withdrawal of ball 110' from within recess 108' serves to operatively disconnect pulley 92a' from clutch plate 96', so as to avoid interference with the tape take-up or winding operation.

When adapter 30 is inverted or placed in its second position, movement of balls 110 and 110' under the influence of gravity serves to release pulley 92a for rotation relative to clutch plate 96, while positively locking pulley 92a' for rotation with clutch plate 96', such that subsequent withdrawal of tape 40 from reel 38' serves to induce tape take-up producing rotations of reel 38. A diameter ratio between the large and small pulleys of on the order of about 3 to 1 and the slip type, friction clutch connection afforded by friction discs 98 and 98' serves to accommodate for variations in the rotational speeds of reels 38 and 38' incident to the transfer of tape therebetween.

To facilitate description of the mode of operation of adapter 30, as thus far described, it will be assumed that tape 40 has been essentially fully wound on reel 38, but with its free end or a first leader end portion thereof threaded through casing 46 and attached to reel 38'; that operator arm 78 is in its first play position; and that the adapter has been inserted into player recess 12, while arranged in its first position. Under the assumed conditions, ball 20 and recess 56 cooperate to releasably retain casing 46 within casing 12 with pinch roller 42 arranged for cooperation with capstan 16; and ball 110 is received within recess 108 to provide for a direct drive connection between spindle 36 and pulley 92a. When player 10 is subsequently turned on and its tape advance control operated to initiate driving rotations of capstan 16, pinch roller 42 cooperates with the capstan to effect withdrawal of tape 40 from reel 38 and drive means 44 is then operative to effect tape take-up producing rotations of reel 38' in the manner previously described. Assuming that player 10 is not turned off, the advancement of tape 40 from reel 38 to reel 38' will continue until the trailing end or a second leader end portion of the tape passes between pinch roller 42 and capstan 16. However, it is preferable to provide both the first and second leader end portions of the tape with suitable indicia, such as strip 120, which can be read or sensed by tape position detecting element 18 so as to deenergize capstan 16 before its associated leader end portion is wound off its associated reel. Then, when a user of player 10 wishes to play another of the tracks present on tape 40 or to effect rewinding of such tape, he would simply withdraw adapter 30 from within recess 12, place operator arm 78 in its second play position, invert the adapter to assume its second position and finally reinsert the adapter within player recess 12. When capstan 16 is once again energized, it will cooperate with pinch roller 42' to withdraw tape from reel 38' and drive means 44 will then be operative to effect tape take-up producing rotations of reel 38.

Reference is now made to FIG. 4, which illustrates an alternative form of the present invention wherein movements of pinch rollers 42 and 42' into their operative and inoperative positions is automatically effected upon insertion of casing 46 within player recess 12. In this form of the invention, the previously described manual operating arm 78 is replaced by a slidably mounted operator bar 122, which has its oppositely disposed ends arranged for receipt within recesses 56 and 56' for engagement by roller 20. Thus, when casing 46 is disposed in its first position and inserted into recess 12, movement of roller 20 into recess 56 serves to effect sliding movements of bar 122 to the left, as indicated by arrow 122a in FIG. 4, with the result that the pinch rollers are forced to move into their illustrated full line positions. Conversely, when casing 46 is disposed in its second position and inserted into recess 12, movement of roller 20 into recess 56' will serve to effect sliding movement of bar 122 in an opposite direction for purposes of placing the pinch rollers in the positions shown in broken line in FIG. 4. Preferably, spring means, such as a leaf spring device 126, would be provided to maintain bar 122 in a centrally located or neutral position when one or the other ends of the bar are not disposed in operative engagement with roller 20. Thus, in a preferred construction, rollers 42 and 42' would tend to assume positions intermediate those shown in FIG. 4 under the control of spring device 126, whenever casing 46 is removed from within recess 12.

Figure 5:
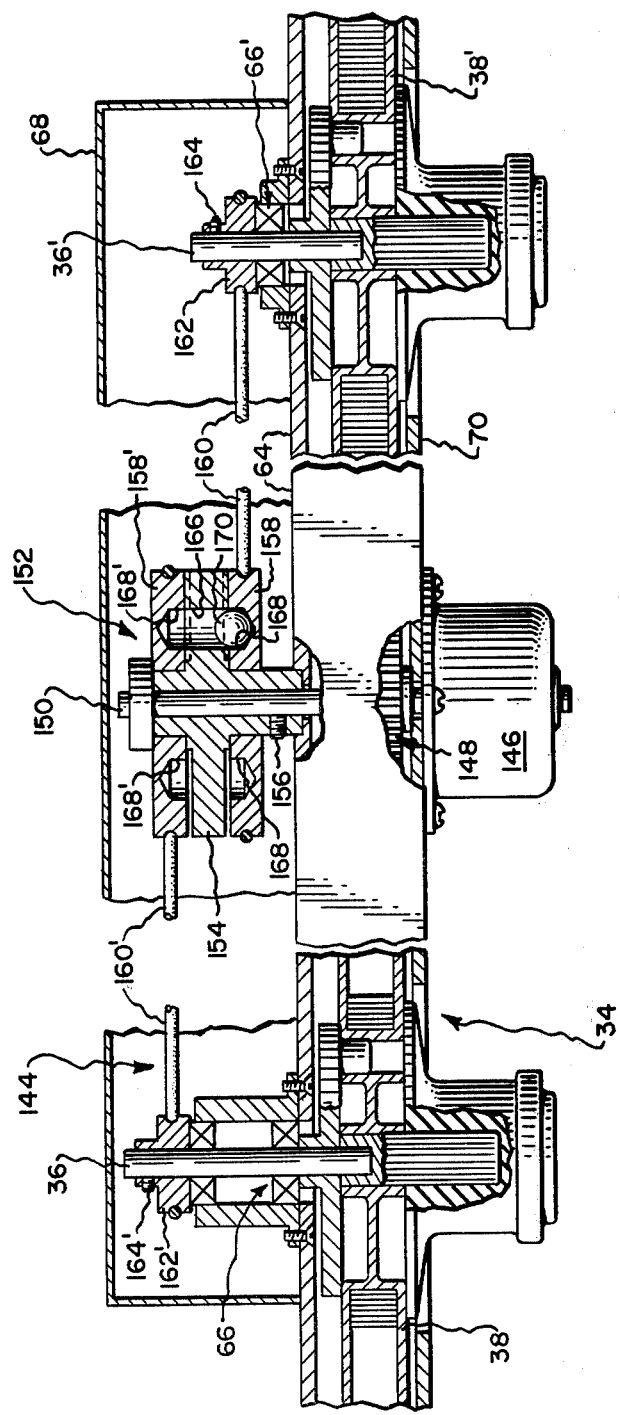
FIG. 5 is a view similar to FIG. 3, but showing another form of the present invention.

Reference is now made to FIG. 5, which shows an alternative form of the present invention characterized in that previously described drive means 44 is replaced by an electrically powered drive train generally designated as 144. Drive train 144 generally comprises a bi-directional electric motor 146, which is connected, as by a suitable speed reduction gear unit 148, to an additional spindle 150 supported for rotation relative to support portion 34 at a position intermediate spindles 36 and 36'. A unitary clutch device 152 is associated with spindle 150 and comprises a clutch plate 154 made rotatably fast to the spindle by a set screw 156 and first and second drive pulleys 158 and 158' coupled by drive belts 160 and 160' to first and second drive pulleys 162 and 162' made rotatably fast to spindles 36 and 36' by set screws 164 and 164', respectively. Clutch plate 154 is formed with a vertically extending through opening 166, which is adapted to be placed in axial alignment selectively with annularly spaced recesses 168 and 168' formed in pulleys 158 and 158' and sized to freely receive a latch element in the form of a ball 170. As will be apparent, the axial lengths of recesses 168 and 168' are slightly in excess of one-half of the diameter of ball 170, such as will allow the ball to alternatively lock pulleys 158 and 158' for rotation with clutch plate 154 when the adapter is in its first and second positions.

Motor 146 may be selectively powered by a battery pack, not shown, or by connection to another convenient source of electrical power such as the cigarette lighter of a vehicle, also not shown. Preferably, the electrical control circuit for motor 146 would include an on-off switch, not shown, which could be manually operated or conveniently arranged for automatic operation incident insertion of the adapter into/removal from player recess 12. The circuit would also preferably include a motor direction control switch, also not shown, which could be made responsive to movements of manual operator 78 or 122 discussed with reference to FIGS. 2 and 4, respectively. Alternatively, gravity responsive mercury switches may be employed to control the direction of rotation of motor 146.

To facilitate discussion of the mode of operation of the form of adapter shown in FIG. 5, it will be assumed that the adapter has been inserted in player 10 to assume its first position shown in FIG. 1, whereby reel 38' is locked for driven rotation by motor 146 via clutch plate 154, pulley 158, belt 160 and pulley 162. Further assuming that motor 146 is energized and driven in a proper direction, reel 38' will be caused to rotate in a tape take-up direction, as capstan 16 and pinch roller 42 cooperate to withdraw tape from reel 38. Motor 146 would of course be chosen to impart a sufficient high rpm to reel 38', when unloaded, to insure proper take-up of tape thereon. As tape builds on reel 38', the load to which motor 146 is exposed would increase and this in turn would result in a sufficient decrease in reel rpm, so as to avoid an excessive "pulling" force being applied to tape passing between capstan 16 and pinch roller 42. Operation would continue until rotation of capstan 16 ceases and motor 146 is deenergized. As will be apparent, additional circuit means, not shown, may be made responsive to strip 120 provided in association with the leader end portion of tape 40 in order to provide for deenergization of motor 146 at the completion of a tape channel playing operation.

By again referring to FIG. 5, it will be understood that the tape wound on reel 38' may be rewound on reel 38 by inverting the adapter to assume its second position, whereby pulley 158' is locked by ball 170 for rotation with clutch plate 154.

I claim:

1. An adapter for use in playing reel-to-reel magnetic tapes on a conventional tape cartridge player of the type including a recess sized to receive a tape cartridge in playing position; tape transport means; magnetic head means; and tape cartridge retaining means, said transport means, head means and retaining means being operably positioned adjacent said recess, said adapter comprising in combination:
- a mounting portion shaped for receipt within said recess alternately in relatively inverted first and second positions;
- a support portion carried by said mounting portion;
- a pair of spindles carried by said support portion for mounting a pair of tape reels; and
- means cooperating with said transport means when said mounting portion is inserted within said recess alternately in said first and second positions for transporting a tape through said mounting portion in operative proximity with said magnetic head means and alternately in opposite directions between said reels.

2. An adapter according to claim 1, wherein said cooperating means includes a pair of pinch rollers arranged within said mounting portion and having operative and inoperative positions, means for moving said pinch rollers alternately into said operative position thereof for cooperation with said transport means for withdrawing said tape from alternate ones of said reels when said mounting portion is in said first and second positions, and separate means for driving the other of said reels in a withdrawn tape take-up direction.

3. An adapter according to claim 2, wherein said separate means is a drive means interconnecting said spindles for effecting tape take-up producing rotations of said other of said reels in response to withdrawn tape induced rotations of said alternate ones of said reels.

4. An adapter according to claim 3, wherein said drive means is responsive to the force of gravity.

5. An adapter according to claim 2, wherein said separate means includes an electric motor and coupling means for drivingly coupling said motor to said other of said reels.

6. An adapter according to claim 4, wherein said coupling means is responsive to the force of gravity.

7. An adapter according to claims 2, 3 or 5, wherein said mounting portion is formed with a pair of recesses arranged to alternately receive said retaining means for releasably retaining said mounting portion within said recess in said first and second positions.

8. An adapter according to claim 7, wherein said means for moving said pinch rollers is responsive to receipt of said retaining means within alternate ones of said pair of recesses.

9. An adapter according to claim 7, wherein said means for moving said pinch rollers is a manually operable linkage coupled with said pinch rollers.

10. An adapter for use in playing reel-to-reel magnetic tapes on a conventional tape cartridge player of the type having a recess sized to receive a tape cartridge in a playing position; tape transport means; magnetic head means; and tape cartridge retaining means, said transport means, said head means and said retaining means being operably positioned adjacent said recess, said adapter comprising in combination:
- a mounting portion having a configuration generally complimentary to the configuration of said tape cartridge and sized for receipt within said recess, said mounting portion having first and second retaining recesses disposed in opposite side walls thereof and arranged to alternately receive said retaining means for releasably retaining said mounting portion within said recess when said mounting portion is inserted within said recess alternately in first and second relatively inverted positions;
- a support portion carried by said mounting portion;
- a pair of spindles mounted on said support portion for mounting a pair of tape reels;
- means for guiding a tape passing between said reels through said mounting portion past said magnetic head means and said transport means when said mounting portion is in said first and second positions;
- means carried by said mounting portion for cooperating with said transport means for withdrawing said tape from alternate ones of said pair of reels when said mounting portion is in said first and second positions; and
- drive means for effecting tape take-up producing rotations of the other of said reels.

11. An adapter according to claim 10, wherein said drive means rotatably couples said spindles for effecting tape take-up producing rotations of said other of said reels in response to withdrawn tape induced rotations of said alternate ones of said reels.

12. An adapter according to claim 11, wherein said drive means includes a pair of drive belts, each of said belts being trained about a pair of pulleys journalled one pulley on each of said spindles, each said pair of said pulleys including a relatively small diameter pulley and a relatively large diameter pulley, wherein each of said spindles carries a relatively small diameter pulley and a relatively large diameter pulley of each of said pairs of pulleys arranged in axially spaced relationship, and a pair of clutch means are associated one with each of said spindles and alternatively operable to drivingly connect said relatively large diameter pulleys to their associated spindles for effecting tape take-up producing rotations of said other of said reels.

13. An adapter according to claim 12, wherein said clutch means are gravity operated and responsive to placement of said mounting portion in said first and second positions.

14. An adapter according to claim 10, wherein said drive means includes an electric motor and coupling means for drivingly connecting said motor alternatively to said spindles.

15. An adapter according to claim 14, wherein said motor is reversible; and said coupling means includes a separate spindle mounted for rotation on said support means, a drive train connecting said motor to said separate spindle for effecting rotations therefor, first and second pulleys journalled on said separate spindle, third and fourth pulleys fixed for rotation one with each of said spindles, a pair of drive belts trained one belt about said first and third pulleys and another belt about said second and fourth pulleys, and a gravity operated clutch for alternatively fixing said first and second pulleys for rotation with said separate spindle when said mounting portion is in said first and second positions thereof.

16. An adapter according to claim 10, wherein said mounting portion has a front wall formed with a centrally located aperture arranged for alignment with said head means when said mounting portion is inserted within said recess alternately in said first and second positions and first and second apertures disposed adjacent opposite sides of said central aperture and arranged for alternate alignment with said transport means when said mounting portion is inserted within said recess in said first and second positions, respectively; said guide means includes a pair of tape guide channels extending one from adjacent each of said side apertures and opening through the rear of said mounting portion for receipt of tape extending from said reels; and said means for cooperating with said transport means includes first and second pinch rollers each having remote inoperative and proximate operative positions relative to said first and second apertures, respectively, and means for alternatively moving said pinch rollers between their respective positions, said pinch rollers being arranged for cooperation with said transport means when disposed in their proximate positions with their associated one of said first and second apertures disposed in alignment with said transport means.

17. An adapter according to claim 16, wherein said means for alternatively moving said pinch rollers includes a linkage operatively responsive to receipt of said retaining means alternately within said retaining recesses.

18. An adapter according to claim 16, wherein said means for alternately moving said pinch rollers is a mechanical linkage coupled to said pinch rollers and having a manual operator extending through said rear of said casing.

19. An adapter for use in playing reel-to-reel magnetic tapes on a conventional tape cartridge player of the type including a recess sized to receive a tape cartridge in playing position; a tape transport means; magnetic head means; and tape cartridge retaining means, said transport means, said head means and said retaining means being operably positioned adjacent said recess, said adapter comprising in combination:

a mounting portion having a configuration generally complimentary to the configuration of said tape cartridge and a pair of recesses arranged to alternately receive said retaining means when said mounting portion is inserted within said recess alternately into relatively inverted first and second positions;

a support portion carried by said mounting portion;

a pair of spindles on said mounting portion for mounting a pair of tape reels;

a pair of pinch rollers arranged within said mounting portion and having operative and inoperative positions;

means for guiding a tape passing between said tape reels through said mounting portion past said head means and said transport means when said mounting portion is in said first and second positions;

means for moving said pinch rollers alternately into said operative positions thereof for cooperation with said transport means for withdrawing said tape from alternate ones of said reels when said mounting portion is in said first and second positions; and means for driving the other of said reels in a withdrawn tape take-up direction.

20. An adapter according to claim 19, wherein said means for driving the other of said reels is responsive to withdrawal of said tape from said one of said reels.

* * * * *